March 15, 1927.
P. M. JOYAL
1,621,017
FISH TRAP
Filed May 15, 1926
3 Sheets-Sheet 2
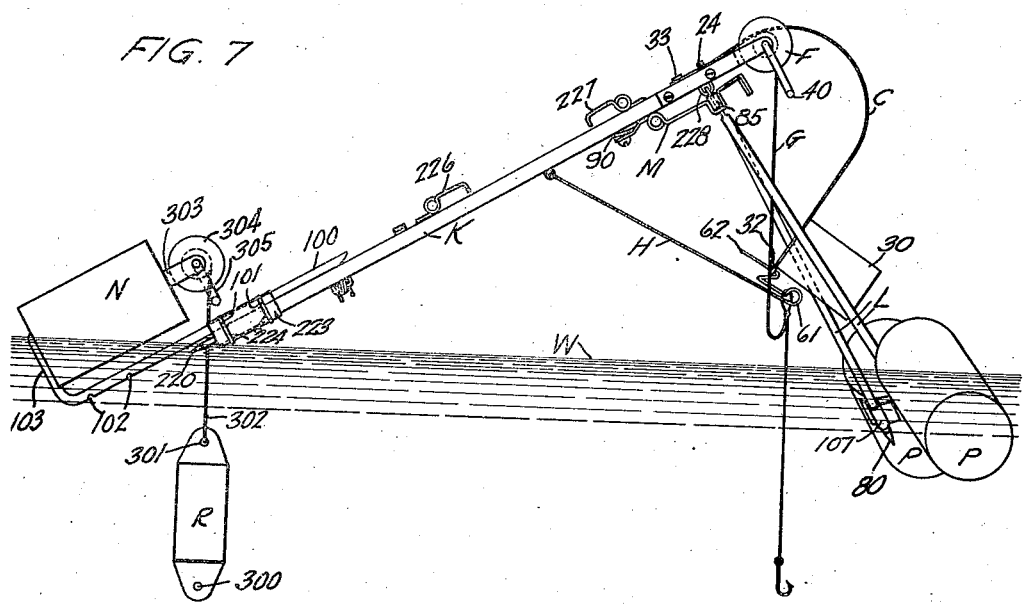
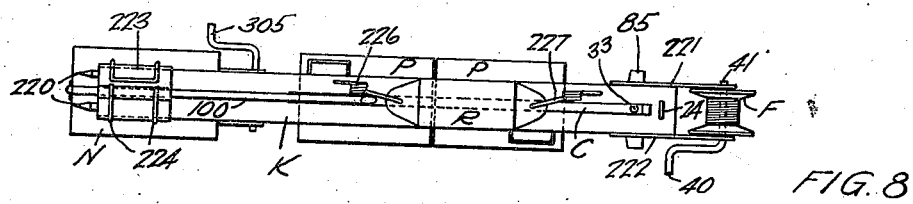
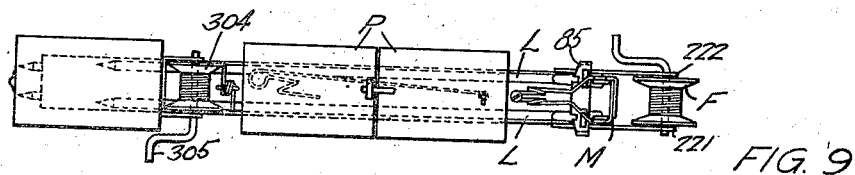
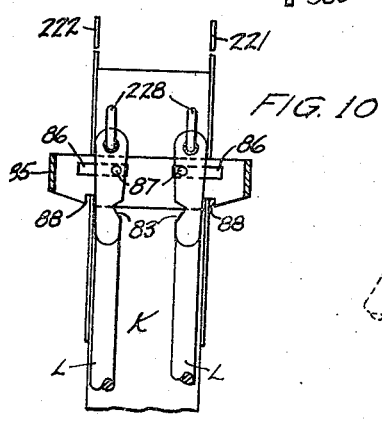
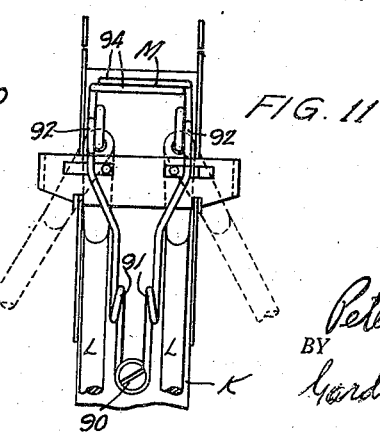
INVENTOR.
Peter M. Joyal
BY
Gardner W. Pearson
ATTORNEYS.

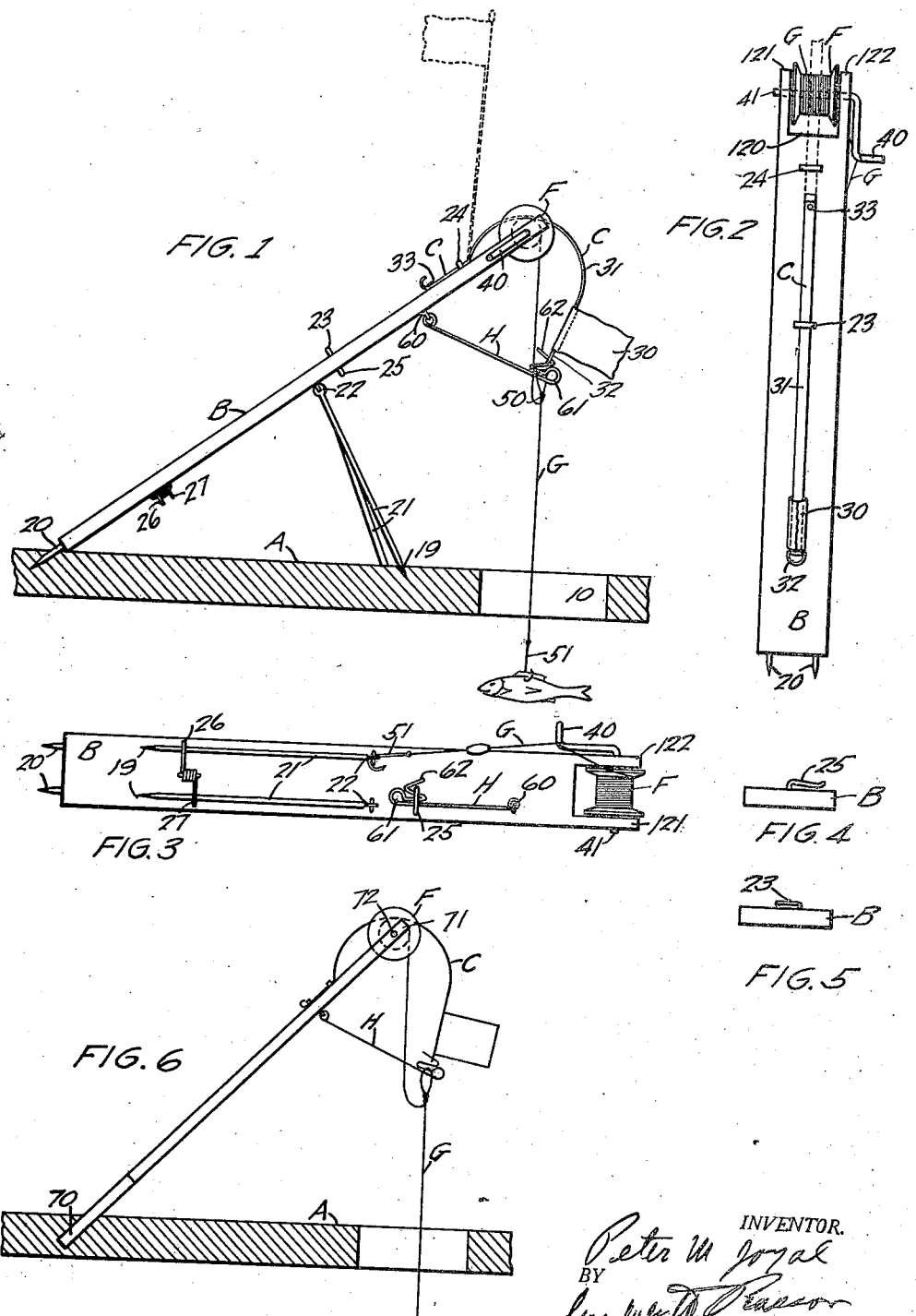

Patented Mar. 15, 1927.

1,621,017

UNITED STATES PATENT OFFICE.

PETER M. JOYAL, OF METHUEN, MASSACHUSETTS.

FISH TRAP.

Application filed May 15, 1926. Serial No. 109,339.

This invention relates to what are known as fish traps such as are used in fishing through the ice.

Such traps are set up near or over a hole cut in the ice and a set fish line is attached in such a way that when the fish bites, a signal, usually having a flag at the top, is released so that the fisherman watching will know that there is a fish on the line.

As there are usually ten or a dozen of these traps used by a single fisherman it is very desirable that each one should be cheap, light and compact so that one man can carry ten or a dozen under his arm. It is very desirable also that each trap should be capable of being quickly set up and quickly removed. As a trap may freeze into the ice and must then be cut out, a construction is desirable where it cannot freeze into place.

It is also desirable that the fish line should be so taken care of that it will not drop on the ice and freeze because in such case there is danger that the fish will break the line when he pulls. It is also desirable that the flag or signal should remain in position and that there should be no danger of it sliding down or falling out of position on account of the wind, or for any other reason.

My trap can be cheaply made, and when folded is very light and compact. It is so arranged that the line is wound on a reel at the end, and when the signal is set, the signal itself serves as a brake to prevent the line from running out and falling on the ice. The signal is also so made that it cannot drop nor slide out of position. Another distinct advantage is that my device can be unpacked or unfolded and set up with great rapidity and can be taken down and refolded with equal speed.

By a slight change or by certain additions, my trap can be used in the summer time for summer float fishing.

In the drawings, Fig. 1 is a side elevation showing my trap in position on the ice.

Fig. 2 is a plan view of the top of my trap with the parts folded for transportation.

Fig. 3 is a plan view of the bottom of my device with the parts folded for transportation.

Fig. 4 is a detail of the catch for holding the trigger member.

Fig. 5 is a detail showing the catch for holding the signal.

Fig. 6 is a side elevation of a modification.

Fig. 7 is a side elevation of my trap in position in the water.

Fig. 8 is a top view of the summer trap folded.

Fig. 9 is a bottom view of the summer trap folded, and Figs. 10, 11, 12, 13, 14, 15, 16, 17, are details of this type of trap.

Figure 12:
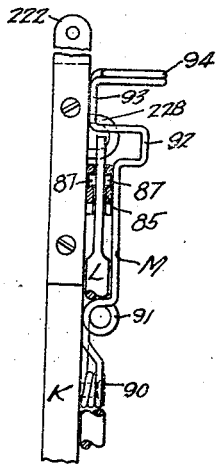

In the drawings, A represents the ice through which a hole 10 is cut.

B is the body which is preferably made flat and of wood with spikes 20, 20 at the lower end which can be easily pushed into the ice at an angle. The other end is split at 120 to form the members 121 and 122 of an open fork in which is pivoted a manually operable reel F carried by a spindle 41 which passes through members 121 and 122 and terminates in a handle 40.

The legs 21, 21, terminate at one end in points 19, 19 to engage the ice, and are pivoted at 22 and 22, medially of body A and underneath it so that they may be folded and may be held in folded position by the spring catches 26 and 27 as shown in Fig. 3.

The signal C is elastic, being preferably made of spring metal 31 and terminates at one end in a flag 30 with a trigger loop 32. Near its other end it is pivoted to the top of body B at 33, and can either be swung around and folded under a catch 23 for transporting or for action swung around under the catch 24. When swung around under the catch 24 it can be bent around over reel F in contact with the wound up line G and can be held over and down in the position shown in Fig. 1 by means of the trigger H pivoted under body B at 60, and having the line loop 61 at its free end which terminates in the signal hook 62 which engages the signal loop 32 to hold down the signal C.

The line G is wound on reel F, and at the right distance, a loop 50 is formed which is slipped over line loop 61, these parts being so made that a pull on the line G will disengage line loop 61 and signal hook 62 from signal C which will then be released and spring up to the position shown by the dotted lines in Fig. 1. This will also release the brake action of signal C on the line G at reel F, and allow the line to run freely in the usual manner.

In Fig. 6 I show a modification of my device in which the body terminates at the bottom in a metal ferrule 70 which is the end by means of which it can be fixed in the ice, as by cutting a hole and wetting it, thus allowing it to be frozen in.

At the other end is an open fork 71 in which is pivoted on spindle 72 a reel F like the one shown in the other views except that there is no winding handle.

The signal C is similar to the one shown in Fig. 1 but there is no catch such as 23. The catches 26 and 27 and 25 also are all omitted.

Trigger H and line G are the same, and the operation is the same.

Figure 13:
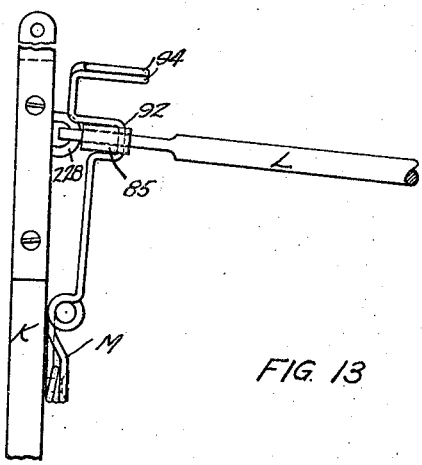
Figure 14:
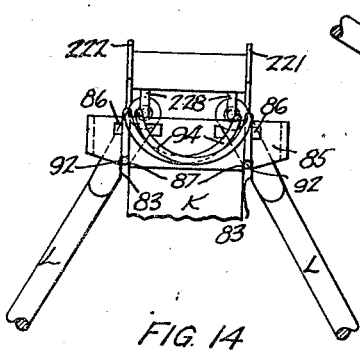
Figure 15:
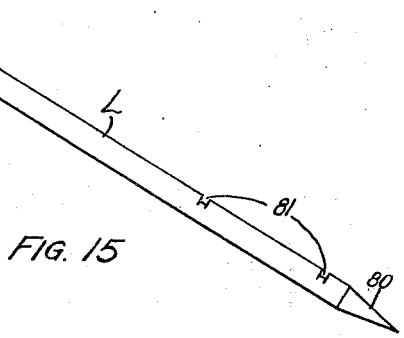
Figure 16:
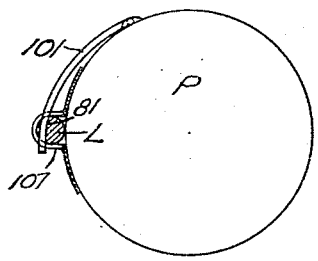
Figure 17:
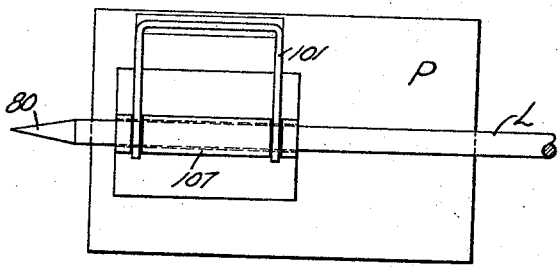

In Figs. 7 to 17 W represents the surface of the water and K represents the body which is preferably of wood and flat having spikes 220, 220 at the lower end and having the forks 221 and 222 in which is pivoted the reel F carried by a spindle 41 which passes through the members 221 and 222, and terminates in a handle 40.

The signal C, together with flag 30 and trigger loop 32, together with the pivot 33 and operating catch 24 are the same as is also the line G and the trigger H which is pivoted under the body K, and has the line loop 61 and the signal hook 62 which engages 32.

At the bottom of body K is sheet metal guide 223 through which passes a metal rod 100 which is the carrier for a float N connected to an angular extension 103. The wire springs 224 are arranged so that they may drop into notches 101, 101, in rod 100 in operative position or into notches 102, 102, on the opposite side when the float is folded in for carrying as shown in Figs. 8 and 9.

Float N carries supports 303 for reel 304 on which anchor line 302 for anchor R is wound by means of a handle 305.

Anchor R has the holes 301 and 300, into which the ends of the springs 226 and 227 enter when the float N is turned around, and the anchor is folded on the top as shown in Fig. 8. When so folded this anchor serves to hold the signal C in folded position.

The other two legs L, L, are also provided with oppositely disposed slots 81 and 82, and are pointed at 80, and these carry the floats P, P, the legs being slidable through members 107, and each float being provided with wire springs 101, 101, which can enter grooves 81 or 82 thus holding the floats either in operative or folded position.

These legs are loosely hung at the top on staples 228, 228, and carry a clevis 85 in both sides of which are slots 86, 86, into which enter pins 87, 87. These slots and pins therefore limit the opening and closing movement of the legs L, L, while the clevis causes the legs to move forward and back together.

The notches 88 in the clevis, and 83 in each leg are shaped so as to register when the legs are spread apart a certain distance, and to engage the members 92, 92 on the wire leg spring M, and to be locked in open position.

This spring M is duplex and is fastened to body K at 90, thence forms coils 91 and extends upward into an outwardly extending locking loop 92, thence back at 93 and out around as handles 94, 94. To set the front legs L, L, the handles 94 are pulled out, the legs are spread, and with the clevis are moved out until locking loop 92 enters the notches 83 and 88 thereby locking the whole in position.

Obviously the floats such as N, P, P, might be fixed in position and they might be larger or smaller in accordance with the material of which the device is made.

They might be of various shapes and might be filled with air or made of cork or of other light material.

I claim:

1. In a trap for ice fishing, the combination of a flat wooden body having a spike at one end and at the other end an open fork in which is pivoted a manually operable reel; with foldable legs pivoted on the body; an elastic signal pivoted at one end to turn sideways and at the other end having a loop adapted to extend beyond the reel; a catch to hold said signal when folded; a trigger having at its free end a line loop and a signal hook so hung under the body as to be adapted to engage the signal loop when the elastic signal is bent around and in contact with the reel, and to hold it in contact therewith.

2. In a trap for ice fishing, the combination of a body having at one end means to fix it on the ice, and at the other end an open fork in which is pivoted a manually operable reel; with an elastic signal pivoted at one end to turn sideways, and at the other end having a loop adapted to extend beyond the reel; a catch to hold such signal when folded; and a trigger having at its free end a line loop and a signal hook so hung under the body as to be adapted to engage the signal loop when the elastic signal is bent around and in contact with the reel, and to hold it in contact therewith.

3. In a trap for ice fishing, the combination of a body having at one end means to fix it on the ice, and at the other end an open fork in which is pivoted a manually operable reel; with an elastic signal pivoted at one end to turn sideways, and at the other end having a loop adapted to extend beyond the reel; and a trigger having at its free end a line loop and a signal hook so hung under the body as to be adapted to engage the signal loop when the elastic signal is bent around and in contact with the reel, and to hold it in contact therewith.

4. In a trap for ice fishing, the combination of a body having at one end means to fix it on the ice, and at the other end an open fork in which is pivoted a manually operable reel; with an elastic signal having a loop adapted to extend beyond the reel; and a trigger having at its free end a line loop and a signal hook so hung under the body as to be adapted to engage the signal loop when the elastic signal is bent around and in contact with the reel, and to hold it in contact therewith.

5. In a trap for ice fishing, the combination of a body having at one end means to fix it on the ice, and at the other end a fork in which is pivoted a reel; with a signal having a loop adapted to extend beyond the reel; and a trigger having at its free end a line loop and a signal hook so hung under the body as to be adapted to engage the signal loop when the elastic signal is bent around and in contact with the reel, and to hold it in contact therewith.

6. In a trap for fishing, the combination of a flat body having a spike at one end and at the other end an open fork in which is pivoted a manually operable reel; with an elastic signal pivoted at one end to turn sideways, and at the other end having a loop adapted to extend beyond the reel; a trigger having at its free end a line loop and a signal loop so hung under the body as to be adapted to engage the signal loop; a float and a float carrier longitudinally slidable at the spike end of the body and adapted to turn and be locked in operative or in folded position; spiked front legs so pivoted medially that they can be folded under the body or can be extended and held in operative position; floats slidable and revoluble on said front legs adapted to be locked in operative or in folded position; and leg springs adapted to lock the front legs in operative position.

7. In a trap for fishing, the combination of a body having a spike at one end and at the other end an open fork in which is pivoted a manually operable reel; with signal having a loop adapted to extend beyond the reel; a trigger having at its free end a line loop and a signal loop so hung under the body as to be adapted to engage the signal loop when the elastic signal is bent around and in contact with the reel, and to hold it in contact therewith; a float at the spike end of the body; and spiked front legs so pivoted medially that they can be folded under the body or can be extended and held in operative position; floats on said front legs.

8. In a trap for ice fishing, the combination of a tripod including a body having at one end an open fork in which is pivoted a manually operable reel; with an elastic signal having a loop adapted to extend beyond the reel; and a trigger having at its free end a line loop and a signal hook so hung under the body as to be adapted to engage the signal loop when the elastic signal is bent around and in contact with the reel, and to hold it in contact therewith.

9. In a trap for ice fishing, the combination of a body having an open fork in which is pivoted a manually operable reel; with an elastic signal having a loop adapted to extend beyond the reel; and a trigger having at its free end a line loop and a signal hook so hung under the body as to be adapted to engage the signal loop when the elastic signal is bent around and in contact with the reel, and to hold it in contact therewith.

PETER M. JOYAL.